(12) United States Patent
Fitch et al.

(10) Patent No.: US 7,522,927 B2
(45) Date of Patent: Apr. 21, 2009

(54) INTERFACE FOR WIRELESS LOCATION INFORMATION

(75) Inventors: James A. Fitch, Edmunds, WA (US);
David A. Hose, Boulder, CO (US);
Michael McNight, Westminster, CO (US)

(73) Assignee: Openwave Systems Inc., Redwood City, CA (US)

(*) Notice: Subject to any disclaimer, the term of this patent is extended or adjusted under 35 U.S.C. 154(b) by 0 days.

(21) Appl. No.: 11/746,528

(22) Filed: May 9, 2007

(65) Prior Publication Data

US 2007/0213074 A1 Sep. 13, 2007

Related U.S. Application Data

(63) Continuation of application No. 09/989,091, filed on Nov. 19, 2001, now abandoned, which is a continuation-in-part of application No. 09/396,235, filed on Sep. 15, 1999, now Pat. No. 6,321,092.

(60) Provisional application No. 60/106,816, filed on Nov. 3, 1998.

(51) Int. Cl.
*H04M 11/00* (2006.01)
*H04L 12/26* (2006.01)
*G08B 5/22* (2006.01)

(52) U.S. Cl. .................. 455/456.2; 455/456.1; 455/444; 370/242; 340/7.22

(58) Field of Classification Search .................. 455/456, 455/456.2, 456.1, 457, 443, 444; 340/7.22, 340/825.49; 370/242
See application file for complete search history.

(56) References Cited

U.S. PATENT DOCUMENTS

| 4,700,374 A | 10/1987 | Bini |
| 5,043,736 A | 8/1991 | Darnell et al. |
| 5,208,756 A | 5/1993 | Song |
| 5,223,844 A | 6/1993 | Mansell et al. |
| 5,235,633 A | 8/1993 | Dennison et al. |
| 5,317,323 A | 5/1994 | Kennedy et al. |
| 5,327,144 A | 7/1994 | Stilp et al. |

(Continued)

FOREIGN PATENT DOCUMENTS

WO WO 98/10307 A1 3/1998

(Continued)

*Primary Examiner*—Charles N Appiah
*Assistant Examiner*—Kiet Doan
(74) *Attorney, Agent, or Firm*—Townsend and Townsend and Crew LLP

(57) ABSTRACT

Multiple location finding equipment (LFE) inputs are used to enhance location information made available to wireless location-based applications. A wireless network utilizes a mobile switching center to route communications between wireless stations, a network platform, and a variety of LFE systems. A Location Finding System (LFS), resident on the network platform, receives location information from the LFEs and provides location information to wireless location based applications. In this regard, the LFS can receive input information at varying time intervals of varying accuracies and in various formats, and can provide standardized outputs to the applications, for example, depending on the needs of the applications. Multiple inputs may also be co-processed for enhanced accuracy. A specification can be used to ensure that location information at least meets certain minimum criteria, such as geographical accuracy, allowable age, acceptable response time, and confidence.

23 Claims, 8 Drawing Sheets

U.S. PATENT DOCUMENTS

| | | |
|---|---|---|
| 5,388,147 A | 2/1995 | Grimes |
| 5,479,482 A | 12/1995 | Grimes |
| 5,485,163 A | 1/1996 | Singer et al. |
| 5,515,419 A | 5/1996 | Sheffer |
| 5,537,460 A | 7/1996 | Holliday, Jr. et al. |
| 5,546,445 A | 8/1996 | Dennison et al. |
| 5,600,706 A | 2/1997 | Dunn et al. |
| 5,608,410 A | 3/1997 | Stilp et al. |
| 5,625,668 A | 4/1997 | Loomis et al. |
| 5,673,322 A | 9/1997 | Pepe et al. |
| 5,724,660 A | 3/1998 | Kauser et al. |
| 5,732,354 A | 3/1998 | MacDonald |
| 5,754,955 A | 5/1998 | Ekbatani |
| 5,815,814 A | 9/1998 | Dennison et al. |
| RE35,916 E | 10/1998 | Dennison et al. |
| 5,826,188 A | 10/1998 | Tayloe et al. |
| 5,835,907 A | 11/1998 | Newman |
| 5,844,522 A | 12/1998 | Sheffer et al. |
| 5,999,126 A | 12/1999 | Ito |
| 6,097,958 A | 8/2000 | Bergen |
| 6,108,555 A | 8/2000 | Maloney et al. |
| 6,321,092 B1 | 11/2001 | Fitch et al. |
| 6,347,227 B1 * | 2/2002 | Johansson ............... 455/456.1 |
| 2001/0053698 A1 | 12/2001 | Karmi et al. |

FOREIGN PATENT DOCUMENTS

| | | |
|---|---|---|
| WO | WO 98/10538 A1 | 3/1998 |

* cited by examiner

INTERFACE FOR WIRELESS LOCATION INFORMATION

CROSS-REFERENCES TO RELATED APPLICATIONS

This application is a continuation of U.S. patent application Ser. No. 09/989,091, filed on Nov. 19, 2001, entitled "Interface for Wireless Location Information," which is a continuation-in-part of U.S. patent application Ser. No. 09/396,235 filed on Sep. 15, 1999, entitled "Multiple Input Data Management For Wireless Location-Based Applications", which claims priority to of U.S. Provisional Patent Application No. 60/106,816, filed on Nov. 3, 1998, entitled "Data Fusion for Wireless Location-Based Applications," each of which is hereby incorporated herein by reference.

BACKGROUND OF THE INVENTION

The present invention relates in general to wireless location-based applications and, in particular, to a method and apparatus for use in processing multiple location finding equipment inputs and making the resulting location information available to wireless location-based applications.

Wireless communications networks generally allow for voice and/or data communication between wireless stations, e.g., wireless telephones (analog, digital cellular and PCS), pagers or data terminals that communicate using RF signals. In recent years, a number of location-based service systems have been implemented or proposed for wireless networks. Such systems generally involve determining location information for a wireless station and processing the location information to provide an output desired for a particular application.

Examples of such existing or proposed applications include emergency or "911" applications, location dependent call billing, cell-to-cell handoff and vehicle tracking. In 911 applications, the location of a wireless station is determined when the station is used to place an emergency call. The location is then transmitted to a local emergency dispatcher to assist in responding to the call. In typical location dependent call billing applications, the location of a wireless station is determined, for example, upon placing or receiving a call. This location is then transmitted to a billing system that determines an appropriate billing value based on the location of the wireless station. In handoff applications, wireless location is determined in order to coordinate handoff of call handling between network cells. Vehicle tracking applications are used, for example, to track the location of stolen vehicles. In this regard, the location of a car phone or the like in a stolen vehicle can be transmitted to the appropriate authorities to assist in recovering the vehicle.

From the foregoing, it will be appreciated that location-based service systems involve location finding equipment (LFE) and location-related applications. To some extent, the LFEs and applications have developed independently. In this regard, a number of types of LFEs exist and/or are in development. These include so-called angle of arrival (AOA) time difference of arrival (TDOA) including handset global positioning system (GPS) and the use of cell/sector location. The types of equipment employed and the nature of the information received from such equipment vary in a number of ways. First, some of these equipment types, like GPS, are wireless station-based whereas others are "ground-based", usually infrastructure-based. Some can determine a wireless station's location at any time via a polling process, some require that the station be transmitting on the reverse traffic channel (voice channel), and others can only determine location at call origination, termination, and perhaps registration. Moreover, the accuracy with which location can be determined varies significantly from case to case. Accordingly, the outputs from the various LFEs vary in a number of ways including data format, accuracy and timeliness.

The nature of the information desired for particular applications also varies. For example, for certain applications such as 911, accuracy and timeliness are important. For applications such as vehicle tracking, continuous or frequent monitoring independent of call placement is a significant consideration. For other applications, such as call billing, location determination at call initiation and call termination or during handoff is generally sufficient.

Heretofore, developers have generally attempted to match available LFEs to particular applications in order to obtain the location information required by the application. This has not always resulted in the best use of available LFE resources for particular applications. Moreover, applications designed to work with a particular LFE can be disabled when information from that LFE is unavailable, e.g., due to limited coverage areas, malfunctions or local conditions interfering with a particular LFE modality. In addition, the conventional query and response mode of operation between applications and the associated LFEs has resulted in the use by applications of LFE dependent data formats, LFE limited data contents, and single LFE input location determinations.

BRIEF SUMMARY OF THE INVENTION

The present invention is directed to a method and apparatus for using multiple LFE inputs to enhance the location information made available to wireless location-based applications. The invention allows wireless location-based applications access to information based inputs from LFEs of different types, thereby enhancing the timeliness, accuracy and/or reliability of the requested location information. Moreover, in accordance with the present invention, applications are independent of particular LFEs and can access location information from various LFE sources without requiring specific adaptations, data formats, or indeed knowledge of the LFE sources employed, in order to access and use such location information. By virtue of such independence, new location finding technologies can be readily deployed and existing applications can exploit such new technologies without compatibility issues. The invention also allows multiple LFE inputs, from one or more LFEs, to be used to allow for wireless station tracking and reduced location uncertainty.

According to one aspect of the present invention, a method is provided for using multiple (i.e., two or more) LFEs to support a wireless location application. The method involves receiving first and second inputs from first and second LFEs, storing location information based on the inputs in memory, receiving a location request regarding a wireless station from a wireless location application, selectively retrieving the location information from memory, and outputting a response to the location request to wireless location application.

The first and second LFEs preferably may employ different location finding technologies, e.g., GPS and other TDOA, AOA, and cell/sector technologies. The stored location information preferably includes at least location information and corresponding time information for particular wireless stations, and may further include location uncertainty information, travel speed information and travel direction information. In response to the location request from the wireless location application, location information may be retrieved from memory or, alternatively, one or more of the LFEs may be prompted to obtain location information. In this regard, the location request may include a specification regarding the desired location information, for example, indicating how recent or how accurate the information should be. If the memory includes information conforming to the specification, then such information is retrieved and output to the requesting application. Otherwise, appropriate information may be obtained by prompting one or more LFEs to locate the wireless station of interest.

In accordance with another aspect of the present invention, a processing system is interposed between the LFEs and the wireless location applications such that the applications can access location information in a manner that is independent of the location finding technology employed by the LFEs. The corresponding process implemented by the processing system involves: receiving LFE dependent location data (i.e., location data having a content and/or format dependent on the location finding technology employed) from multiple LFEs receiving a location request from a wireless location application seeking LFE independent location data (i.e., location data having a content and format independent of any particular location finding technology) and responding to the location request based on LFE dependent location data. The process implemented by the processing system may further involve generating and storing LFE independent location data based on the LFE dependent data. The processing system may be resident on the location finding controllers associated with each LFE, on a separate platform and/or the processing system functionality may be distributed over multiple platforms.

According to a still further aspect of the present invention, multiple LFE inputs are utilized to make a location determination regarding a wireless station. The corresponding method involves the steps of receiving a first location input from a first LFE including first location information and first uncertainty information, receiving a second location input from a second LFE including second location information and second uncertainty information and combining the first and second location inputs to provide a combined location input including combined location information and uncertainty information based on the first and second inputs. Preferably, the first and second inputs include raw location and uncertainty information obtained from LFE measurements prior to aggregation and related processing. One or both of the first and second inputs may constitute partial information, insufficient on its own to yield a location and uncertainty regarding the wireless station within the requirements of the wireless location application. For example, in the case of LFEs that determine location based on readings obtained relative to two or more cell sites, a reading from one of the cell sites may be used in conjunction with other location information, e.g., cell sector information, to make a location determination.

According to another aspect of the present invention, multiple LFE inputs, obtained at different times from the same or different LFEs, are utilized to derive tracking information such as for obtaining improved location determination accuracy. The associated method includes the steps of receiving a first LFE input including first location information and first corresponding time information for a particular wireless station, receiving a second LFE input including second location information and second time information for the wireless station, and using the first and second inputs to derive tracking information for the wireless station. The tracking information preferably includes information regarding the mobile station's speed of travel and direction of travel. This tracking information can be used in conjunction with subsequent LFE inputs for the wireless station to improve location determination accuracy and can also be used to interpolate wireless station location between location determinations, or to project future wireless station locations as may be desired for some applications. It will be appreciated that this tracking function and other functions are facilitated by the provision of a system for receiving inputs from one or more LFEs, standardizing such inputs with regard to data content and format, and storing such information. In particular, such standardized and stored information can be readily analyzed to yield derivative information regarding wireless station position as well as statistical information for wireless stations of interest in the service area.

A system constructed in accordance with the present invention includes an input facility for receiving inputs from multiple LFEs, a memory such as a cache for storing information from the LFE inputs (e.g., a wireless station identification, a location, a time associated with that location, an uncertainty for that location, and travel speed and bearing), an interface for receiving location requests from wireless location applications and providing responses to such requests, and a processing subsystem for processing the LFE inputs and location requests. The apparatus may also include a facility for prompting LFEs to make location measurements in response to location requests. Among other things, the processing subsystem may convert the LFE inputs into a standard format, direct storage of data in the memory, derive tracking or other derivative information from multiple inputs, analyzing stored information relative to received location requests to determine whether the stored information includes information responsive to the requests and selectively directing the LFEs to make location measurements. The system may be resident on a single or multiple platform and the functionality may be spread among multiple applications.

BRIEF DESCRIPTION OF THE DRAWINGS

For a more complete understanding of the present invention and further advantages thereof, reference is now made to the following detailed description taken in conjunctions with the drawings in which.

DETAILED DESCRIPTION OF THE INVENTION

In the following description, particular embodiments and implementations of the present invention are set forth in the context of a telecommunications network. It will be appreciated however, that various aspects of the invention are more broadly applicable to other location based services environments.

Figure 1:
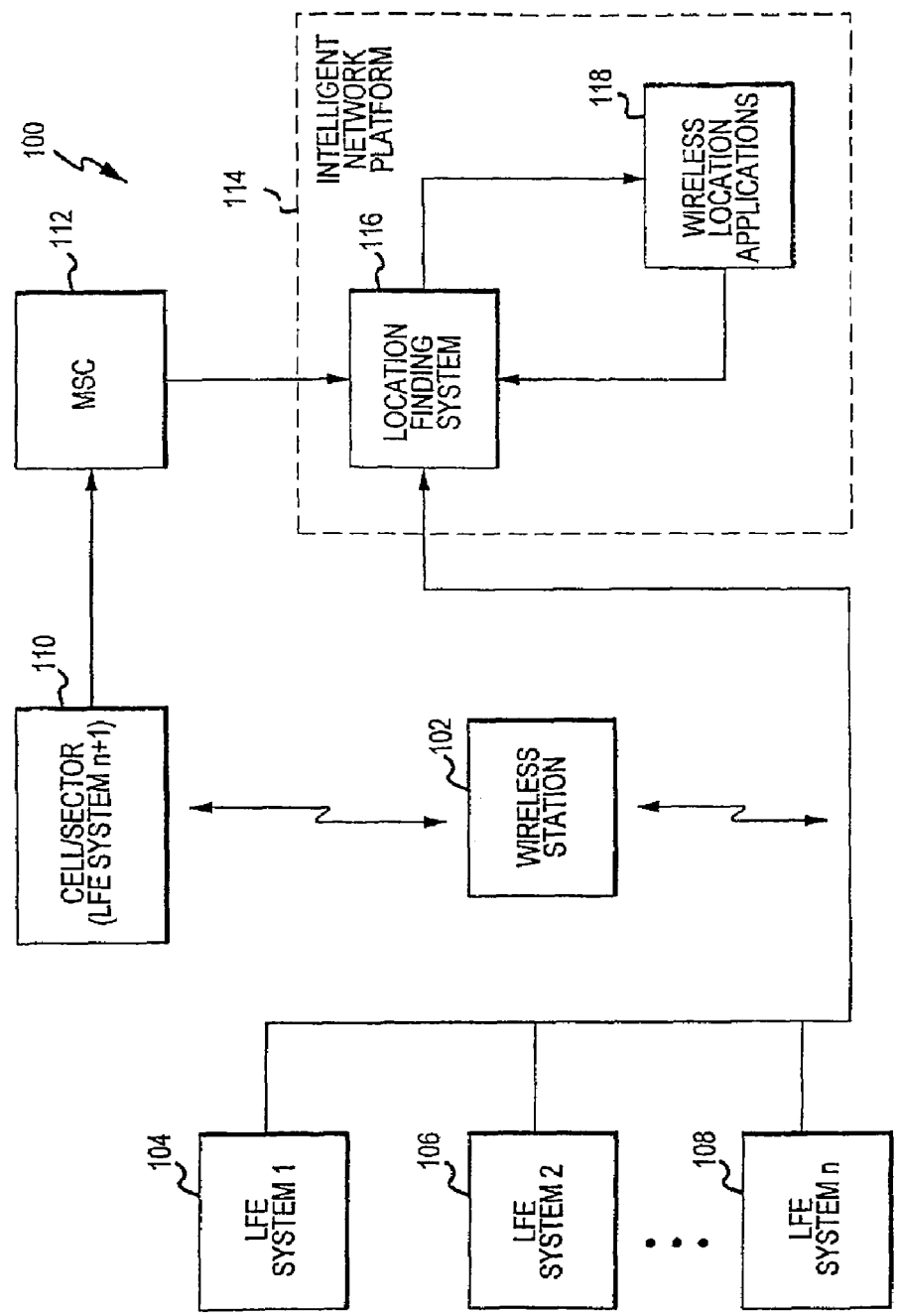
FIG. 1 is a schematic diagram of a wireless network implementing a location finding system in accordance with the present invention.

Referring to FIG. 1, a wireless telecommunications network implementing the present invention is generally identified by the reference numeral 100. Generally, the network includes a mobile switching center (MSC) 112 for use in routing wireless communications to or from wireless stations 102, a network platform 114 associated with the MSC 112 for implementing a variety of subscriber or network service functions, and a variety of location finding equipment (LFE) systems 104, 106, 108 and 110. In the illustrated embodiment, the network platform is used to run a Location Manager (LM) 16 in accordance with the present invention and a number of wireless location applications 118. Although the illustrated location finding system 116 and wireless location applications 118 are illustrated as being resident on the network platform 114, it will be appreciated that the elements 116 and 118 may be located elsewhere in the network 100, may be resident on separate platforms, or the functionality of each of these elements 116 and 118 may be spread over multiple platforms. In addition, other applications not depicted in FIG. 1 may be resident on the platform 114.

As shown in FIG. 1, multiple LFE systems 104, 106, 108 and 110 may be associated with the network 100. These LFE systems 104, 106, 108 and 110 may employ any of a variety of location finding technologies including AOA, TDOA such as GPS and cell/sector technologies and the various systems 104, 106, 108 and 110 may be the same as or different from one another. It will be appreciated that the nature of the data obtained from the LFE systems 104, 106, 108 and 110 as well as the path by which the data is transmitted varies depending on the type of LFE employed, and the ability to accommodate a variety of LFEs is an important advantage of the present invention. Some types of LFEs include LFE equipment in the handset. Examples include certain GPS and other TDOA systems. In such cases, location information may be encoded into signals transmitted from the handset to a cell site or other receiver, and the information may then be transferred to the platform 114 via the MSC 112 or otherwise. Other LFE systems, i.e., embedded systems, use equipment associated with individual cell sites such as specialized antennae to make location determinations such as by triangulation and, again, the resulting location information may be transferred to the platform 114 via the MSC 112 or otherwise. Still other LFE systems employ a network of dedicated LFE equipment that is overlaid relative to the wireless network. Such systems may communicate location information to the platform 114 independent of the MSC 112 and network cell site equipment. In addition, some LFE technologies can be implemented via equipment resident in the handset, in cell sites or other network locations and/or in dedicated LFE sites such that the data pathway of the location information may vary even for a given LFE technology.

Three of the illustrated systems 104, 106 and 108 operate separate from the MSC 112. For example, such systems may include network based AOA systems and network based TDOA systems and external systems such as GPS. Generally, the illustrated network based systems such as AOA and network TDOA systems determine the location of a wireless station 102 based on communications between the wireless station and the cell site equipment of multiple cell sites. For example, and as will be described in more detail below, such systems may receive information concerning a directional bearing of the wireless station 102 or a distance of the wireless station 102 relative to each of multiple cell sites. Based on such information, the location of the wireless station 102 can be determined by triangulation or similar geometric/mathematic techniques. External systems such as GPS systems, determine the wireless station location relative to an external system. In the case of GPS systems, the wireless station 102 is typically provided with a GPS receiver for determining geographic position relative to the GPS satellite constellation. This location information is then transmitted across an air interface to the network 100.

The illustrated cell sector system 110 may be associated with cell site equipment for communicating with the wireless station 102. In this regard, the cell site equipment may include three or more directional antennas for communicating with wireless stations within subsections of the cell area. These directional antennas can be used to identify the subsection of a cell where the wireless station 102 is located. In addition, ranging information obtained from signal timing information may be obtained to identify a radius range from the cell site equipment where the wireless station 102 is located, thereby yielding a wireless station location in terms of a range of angles and a range of radii relative to the cell site equipment. This cell/sector location information can be transmitted to the LM 116 via the MSC 112 or possibly via other network information or structure.

As shown, the LM 116 receives location information from the various LFE systems 104, 106, 108 and 110. The nature of such information and handling of such information is described in more detail below. Generally, however, such information is processed by the LM 116 to provide location outputs for use by any of various wireless location applications 118 in response to location requests from the application 118. Such applications may include any location-based services applications such as 911, vehicle tracking and location-based billing programs.

Figure 2:
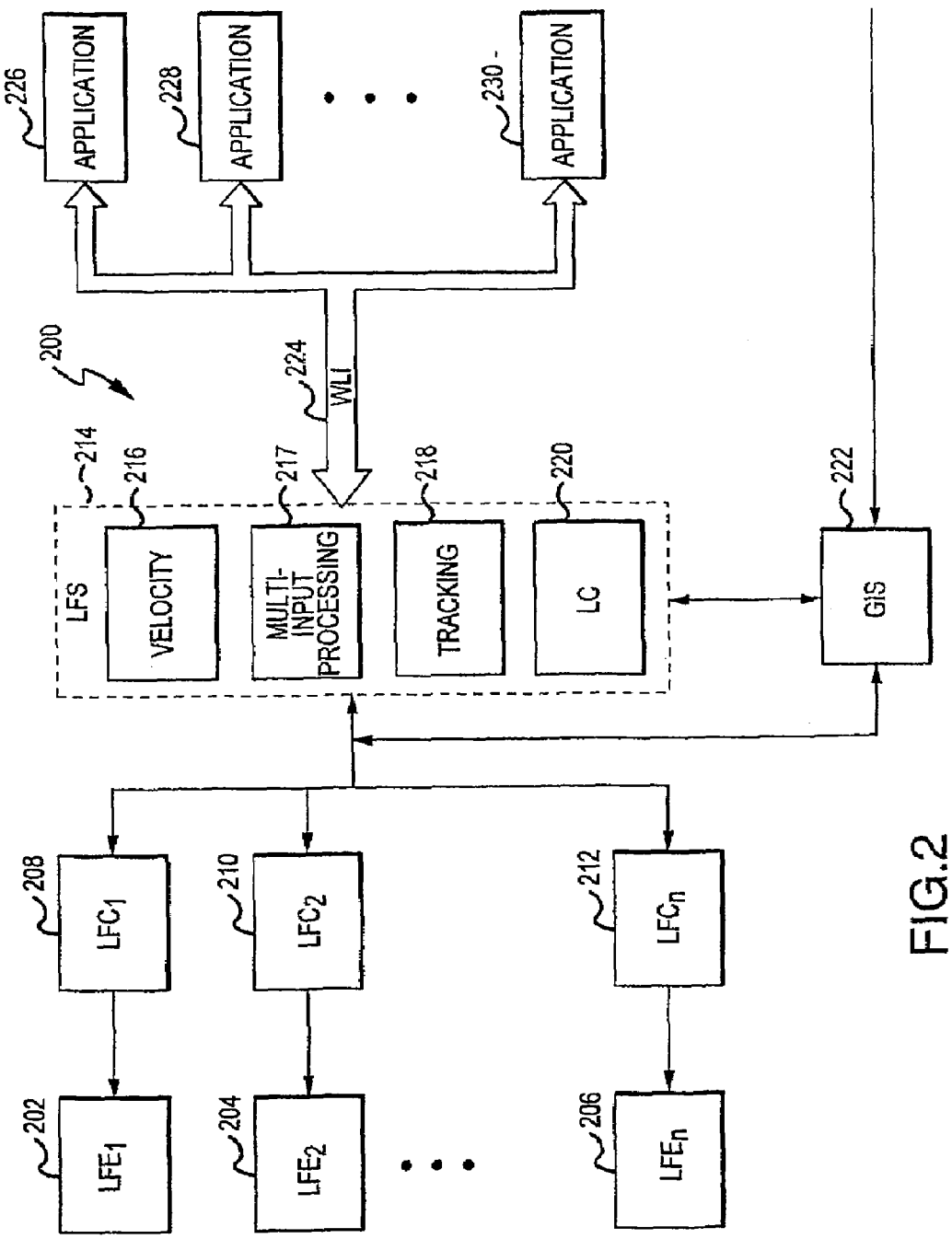
FIG. 2 is a schematic diagram illustrating a wireless location-based services system in accordance with the present invention.

FIG. 2 illustrates a location-based services system 200 in accordance with the present invention. An important aspect of the present invention relates to the operation of the LM 214 to receive inputs from multiple LFEs 202, 204 and 206 and provide location outputs to multiple applications 226, 228 and 230. In accordance with the present invention, the LFEs 202, 204 and 206 may be based on different technologies, and may therefore provide different types of location information, in different data formats, with different accuracies based on different signals.

Figure 3A:
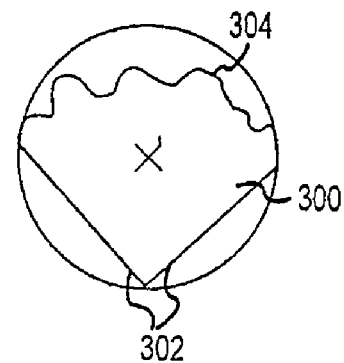
FIGS. 3a-3e illustrate various location finding technologies that may be utilized in the context of the present invention.

A number of different location finding technologies are depicted in FIGS. 3a-3d for purposes of illustration. FIG. 3a generally shows the coverage area 300 of a cell sector. As noted above, the cell site equipment for a particular cell of a wireless telecommunications system may include a number, e.g., three or more, of directional antennas. Each antenna thus covers an angular range relative to the cell site bounded by sides 302. In the case of a three sector cell, each antenna may cover about 120.degree.-150.degree. relative to the cell site. In addition the coverage range for the antenna defines an outer perimeter 304 of the coverage area 300. As shown, the range varies with respect to angle defining a somewhat jagged outer perimeter 304. Accordingly, the actual uncertainty regarding the location of a wireless station located in the illustrated cell sector is defined by the coverage area 300. The location determination output from a cell/sector LFE is therefore effectively defined by the coordinates of the coverage area 300.

Figure 3B:
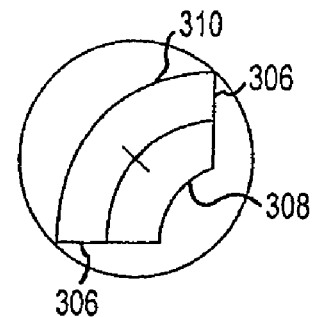

FIG. 3b depicts a TOA based LFE. In this case, the wireless station's range from a cell sector antenna is determined, based on time of signal arrival or signal transit time to within a radius range, e.g., about 1000 meters. Accordingly, the wireless station's location can be determined to be within an area bounded by sides 306 (based on the angular range of the cell sector antenna) and inner 308 and outer 310 arcs (defined by the ranging uncertainty). The output from a TOA based LFE is effectively defined by the coordinates of the sides 306 and the axes 308 and 310.

Figure 3C:
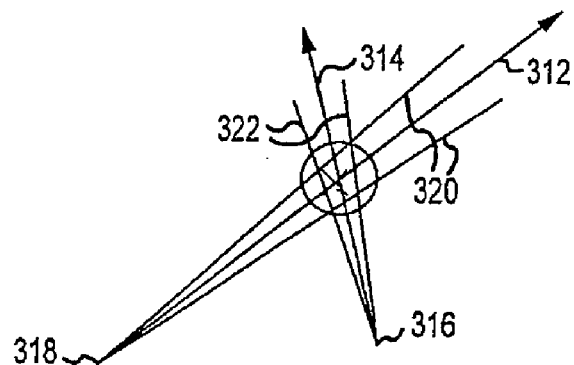

An AOA based LFE is generally illustrated in FIG. 3c. AOA based LFEs determine the location of a wireless station based on the angle of arrival of signals, generally indicated by rays 312 and 314, from the wireless station as measured by two or more cell sites 316 and 318. Each angle measurement has an angular uncertainty generally indicated by line segments 320 and 322. Consequently, the uncertainty region for a given location determination is defined by a polygon having 2n sides, where n is the number of cell sites 316 and 318 involved in the measurement.

Figure 3D:
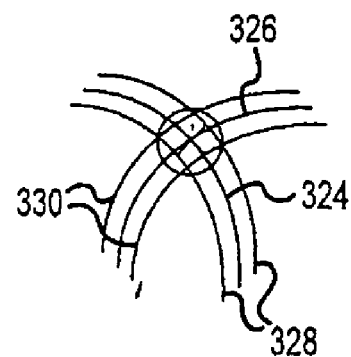

FIG. 3d illustrates a TDOA based LFE. Although the illustrated system is cell site based, the TDOA system may alternatively be handset based. In TDOA systems, multiple cell sites measure the time of arrival of signals from a wireless station. Based on such measurements, each cell site can provide information regarding wireless station location in terms of a hyperbola 324 or 326 and an uncertainty, generally indicated by segments 328 and 330. The resulting uncertainty region is defined by a multi-sided region (where each wall is curved) having 2n walls, where n is the number of cell sites involved in the determination.

Figure 3E:
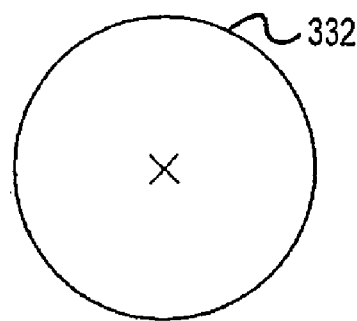

FIG. 3e illustrates a GPS based LFE. In GPS systems, the wireless station includes a GPS transceiver for receiving signals indicating the wireless station's location relative to multiple satellites in the GPS constellation. Based on these signals, the geographic coordinates of the wireless station's location is determined to an accuracy of perhaps 20 meters as generally indicated by circle 332. This information is then transmitted to the wireless network across an air interface.

Another type of LFE is network assisted GPS. GPS is a TDOA system requiring signals from a minimum of three satellites to locate on a two dimensional surface, e.g., geographical coordinates. The location is determined as the intersection of the hyperbolas defined by the range differences between each pair of satellites. When the number of satellites in view is reduced to a single pair, the location can be determined by the intersection of the resulting hyperbola and other geometric figures such as the serving cell boundaries.

Referring again to FIG. 2, each of the LFEs 202, 204 or 206 outputs location information to its respective LFC 208, 210 or 212. The nature of this "raw" LFE output depends in part on the type of LFE involved. For example, in the case of a cell sector system the output may be a sector identifier or coordinates; in the case of a TOA system, the output may be a sector identifier or coordinates and a radius; in an AOA system the output may be angular measurements and corresponding cell site identifiers/coordinates; in TDOA systems the output may define multiple hyperbolae; and in GPS systems the output may be geographic coordinates.

The LFCs 208, 210 and 212 collect and aggregate the "raw" location into a standard format which is then sent to the location cache (LC) 220 of the LM 214 for storage. Aggregation involves using the raw data to determine a wireless station location and uncertainty. For some LFE systems, such as GPS systems, this process is simple because location coordinates are reported and the uncertainty is known. For other LFE systems, aggregation is more involved. For example, in the case of TDOA, aggregation may involve receiving multiple hyperbola definitions and using these definitions to define a wireless station location and a multi-sided uncertainty region. The LFCs 208, 210 and 212 may be provided by the LFE vendors or their functionality may be incorporated into a subsystem of the LM 214.

In the context of the present invention, it is useful to express the location information in a standard format. Accordingly, the LFCs 208, 210 and 212 or a cooperating subsystem of the LM 214 associated with the LC 220, may implement a conversion facility for converting the determined (processed) location information of the LFCs 208, 210 and 212 into standardized location information expressed, for example, as geographical location coordinates and a region of uncertainty. The uncertainty region may be of any shape (e.g., polygonal) depending, for example, on the nature of the LFE(s) employed. Once such type of uncertainty region is a circular region that can be characterized by an uncertainty radius. In the illustrated embodiment, two dimensional location coordinates are defined (e.g., latitude and longitude) together with an uncertainty radius applied relative to the location coordinates. It will be appreciated that the standard format may allow for altitude coordinates, non-circular uncertainty regions and other parameters.

Referring again to FIGS. 3a-3e, examples of these coordinates and circular uncertainty regions are graphically depicted. In particular, in each case, a location "L" and standardized uncertainty region "C" are geometrically defined such that the standardized uncertainty region C circumscribes the actual uncertainty region associated with that location finding technology. In this regard, the location L may be defined first (e.g., as the intersection of rays 312 and 314 in FIG. 3c) and then the minimum radius circle C may be defined to circumscribe the actual uncertainty region; the standardized uncertainty region C may be defined first (e.g., as the minimum radius circle required to circumscribe the actual uncertainty region) and then L be defined as the center of the circle C; or any other appropriate geometric solutions/approximations may be employed.

This standardized location information is then stored in a database in LC 220. Specifically, the location coordinates for a wireless station and corresponding uncertainties can be stored in a field, in a relational database, or can otherwise be indexed to a wireless station identifier, e.g., a cellular telephone Electronic Serial Number/Mobile Identification Number (ESN/MIN). The coordinates and uncertainty may be expressed in terms of any appropriate units. For example, the coordinates may be expressed as latitude and longitude values in units of $10.^{-6}$ degrees and the uncertainty may be expressed in units of meters.

The stored, standardized information can be used to perform a number of multiple input analyses. Three examples of such facilities are generally indicated by the velocity 216, multi-input processing 217 and tracking 218 facilities of LM 214. The velocity facility 216 involves determining and storing speed information and direction (bearing) information for a wireless station based on multiple LFE inputs for the station. Because of the standardized format, such determinations can be easily made relative to inputs from the same or different LFEs 104, 106 and/or 108. The velocity information can be obtained based on knowledge of the change in position and the change in time (determined by way of the time stamps associated with the location information) and may be expressed in terms of latitudinal and longitudinal velocity components in units of meters per second, together with velocity uncertainty terms. The direction information can be directly obtained from the location information, or can be based on a ratio of the velocity components, using standard trigonometric principles. It will be appreciated that such speed and direction information may be useful for a variety of applications such as vehicle tracking.

The multi-input processing facility 217 can be used to improve location accuracy based on multiple inputs from the same or, more preferably, different LFEs 202, 204 and/or 206.

That is, if two locations with two uncertainties can be obtained for a given wireless station at a given time, a reduced uncertainty can be calculated as the overlap of the two original uncertainties. A complicating factor is that the locations and uncertainties stored in the LC 220 for a given wireless station will typically not represent location determinations for the same time. Because wireless stations are generally mobile, an additional element of uncertainty is introduced.

The illustrated multi-input processing facility 217 takes time into account. This is accomplished by:

1. accessing the LC 220 to obtain two (or more) sets of location information for a given wireless station;
2. identifying a location, uncertainty and time for each set of information;
3. determining a time difference between the times of the information sets;
4. calculating an element of location uncertainty associated with the time difference; and
5. applying the calculated element of location uncertainty to the earlier location information to obtain time translated location information.

This time translated location information can then be compared to the later location information in an uncertainty overlap analysis, as described below, to obtain a reduced uncertainty.

Various processes can be employed to calculate the additional, time-related element of location uncertainty. A simple case involves assuming a maximum rate of travel. For example, a maximum rate of travel of 70 miles per hour may be assumed to account for travel of a mobile phone in a vehicle. The uncertainty associated with an earlier location determination may then be expanded by a value determined by multiplying the maximum rate of travel by the time difference between the two measurements to be compared. Different maximum travel rates may be assumed for different conditions, for example, a lower rate may be assumed for city locations than for suburban locations, a lower rate may be assumed for peak traffic periods, or a lower rate may be assumed for mobile stations that are not generally used on fast moving vehicles. Also, wireless station speed and direction information as described above or other tracking information as described below may be used to reduce the time-related element of uncertainty.

Figure 4:
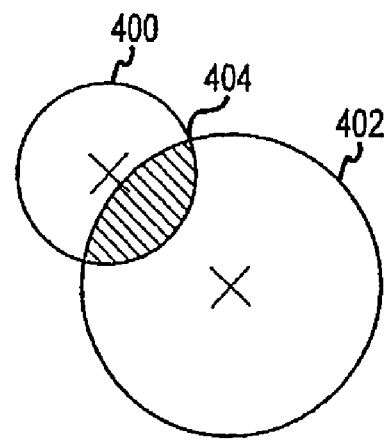
FIG. 4 is a graphical illustration of the use of multiple LFE inputs to reduce location uncertainty in accordance with the present invention.

Once such a time translation process has been employed to normalize multiple LFE inputs relative to a given time, an uncertainty overlap analysis can be implemented. Such an analysis is graphically illustrated in FIGS. 4 and 5. Referring first to FIG. 4, the smaller circle represents a location and uncertainty associated with a later LFE input taken to be at time $t_1$. The larger circle 402 represents a location and uncertainty associated with a time translated location information based on an earlier LFE input taken to be at time $t_0$. Circle 402 is illustrated as having a larger uncertainty than circle 400 to account for the additional time and travel related element of uncertainty associated with the time translation. The shaded overlap area 404 represents the reduced uncertainty achieved by using multiple inputs. That is, statistically, if circle 400 represents a 95% confidence level regarding the position of the station at $t_1$ and circle 402 represents a nearly 95% confidence level regarding the position of the station at $t_1$, the position of the station can be determined to be in the shaded area 404 with a high level of confidence.

Figure 5:
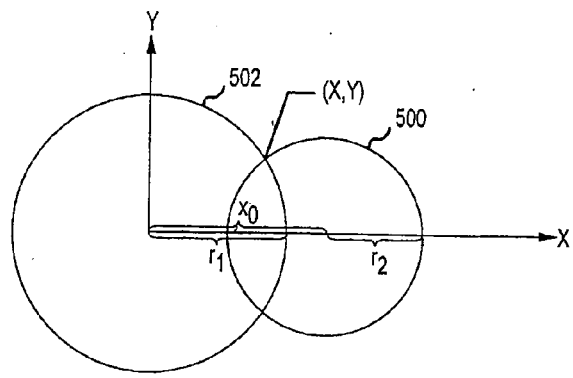
FIG. 5 is a graphical depiction of a location uncertainty analysis in accordance with the present invention.

FIG. 5 illustrates a mathematical process for combining the original uncertainties to obtain a more accurate position and uncertainty. Mathematically, the problem is to compute the intersection of the circular uncertainty regions, and express the result as a location with an uncertainty (e.g., a circular uncertainty circumscribing the intersection region). To simplify the mathematics, the geometric arrangement of FIG. 4 is translated to provide a first axis (x in FIG. 5) that extends through the centerpoints of the circular uncertainty regions 500 and 502 (generally, the coordinates of the originally determined locations) and an orthogonal axis (y) intersecting the center of the larger (in this case later) circular uncertainty region 502. The mathematical equations for the boundaries of circular uncertainty regions 500 and 502 are:

$$x^2+y^2=r_1^2 \quad (1)$$

$$(x-x_0)^2+y^2=r_2^2 \quad (2)$$

It will be appreciated that the values of $r_1$, $r_2$ and $x_0$ are known as these are the uncertainty of the time translated information, the uncertainty of the later LFE input and the difference between $r_1$ and $r_2$, respectively. Equations (1) and (2) can then be simultaneously solved to obtain x and y, where x is the new location and y is the radius of the new uncertainty region. Finally, these values can be translated back into Earth coordinates. This mathematical analysis can be used for cases where $x \leq x_0$ and $x_0 \leq r_1+r_2$. In other cases, the most recent or most accurate of the LFE inputs can be utilized.

The illustrated LM 214 also includes a tracking facility 218. Such tracking involves using historical information (at least two sets of location information) and using such information to reduce the uncertainty associated with current measurements. That is, by tracking movement of a wireless station, information can be obtained that is useful in analyzing the uncertainty of current measurements. In a simple case, where tracking information indicates that a wireless station is moving in a straight line (or otherwise on a definable course) or at a constant speed, then curve fitting techniques or other simple algorithms can be employed to obtain a degree of confidence concerning current location. Moreover, interpolation and extrapolation techniques can be employed to determine location at times between measurements or in the future. Such information may be useful to determine when a wireless station crossed or will cross a boundary as may be desired, for example, for location-based billing applications or network management applications (for handling hand-off between adjacent cells). It will thus be appreciated that the information stored in the LC 220 may include wireless station identifiers, locations, uncertainties, confidence levels, travel speeds, travel directions, times and other parameters. Data may be purged from the LC upon reaching a certain age in order to remove visitor data and other unnecessary data.

The velocity facility 216, multi-input processing facility 217, and tracking facility 218 may use the raw information data transmitted from the LFEs 202, 204 and 206 to the LFCs 208, 210 and 212 in place of, or in addition to, the LFC outputs. For example, the multi-input processing facility 217 may use a hyperbola definition from a TDOA system in combination with an angle from an AOA system (or other combination of partial LFE outputs) if such combination yields an improved location accuracy or otherwise provides a suitable location determination. Similarly, it may be preferred to use the raw data for velocity or tracking calculations as such data is mathematically closer to the moving wireless station and may more accurately reflect station movement.

Information residing in the network for the purposes of handover management, e.g., Network Measurement Report (NMR) and Mobile Assisted Hand-Off (MAHO) can be used to locate the mobile unit inside the serving cell boundary and reduce the uncertainty to a fraction of the cell size. The intersection of potential serving cells provides a location estimate with a Circular Error Probability (CEP) that is significantly smaller than the CEP of the serving cell. Alternatively, matching the received signal strengths from theses cells with accurate predictions results in estimates with even smaller CEP. The intersection of any of these uncertainty circles with the GPS hyperbola provides a new estimate of location.

Using this, the mobile unit is positioned at the center of the hyperbola segment bounded by the uncertainty circle. The uncertainty in this new estimate is confined to the area bounded by that circle and the uncertainty hyperbolas around the nominal value. The area of the ellipsoid that contains this figure is smaller than the area of the CEP. Thus, the accuracy of the new estimate is higher than either of its components by themselves.

The above process and conclusions apply also to GPS/AFLT, which replaces lost satellites with signals from base stations.

Another use of multiple location sources is related to situations when there is no overlap between two independently obtained location estimates (taking into account the uncertainty associated with each estimate) such as GPS and NMR. In such a situation a weighting can be applied to each estimate to derive a new location and uncertainty estimate that is different than each independently obtained estimate. However, another approach is to re-query the network to obtain new location estimates based on the premise that the reason for the lack of an overlap between the two estimates is that one of these location estimates is incorrect. Depending on the results of the new query a new estimate can be determined which may be a weighted average of the two, the intersection of the two or in some case a decision may be made to only use one of the estimates.

Referring again to FIG. 2, the illustrated system 200 includes a wireless location interface (WLI) 224 that allows wireless location applications 226, 228 and 230 to selectively access information stored in the LC 220 or prompt one or more of LFEs 202, 204 and/or 206 to initiate a location determination. The WLI 224 provides a standard format for submitting location requests to the LM 214 and receiving responses from the LM 214 independent of the location finding technology(ies) employed. In this manner, the applications can make use of the best or most appropriate location information available originating from any available LFE source without concern for LFE dependent data formats or compatibility issues. Moreover, new location finding technologies can be readily incorporated into the system 200 and used by the applications 226, 228 and 230 without significant accommodations for the existing applications 226, 228 and 230, as long as provision is made for providing data to the LC 220 in the form described above.

The WLI 224 of the illustrated implementation allows the applications to include a specification with a location request regarding the desired location information. For example, the specification may include one or more of the following: the timeliness of the location information (e.g., not older than [date stamp parameter]), the accuracy of the information (e.g., uncertainty not exceeding [uncertainty parameters]), confidence (confidence at least equal to [confidence parameter]). Alternatively, the request may specify the use of the most recent available information, most accurate available information, etc. In addition, the location request can specify whether the request is for one-time only location information or ongoing monitoring of a mobile station, whether the LM 214 should wait for the next available update or force a location determination, whether redundant or unnecessary updates should be filtered (e.g., do not send updates more often than once a minute or if wireless station has moved less than 50 meters), and what the priority of the request is. In this manner, ongoing monitoring may be employed, for example, by applications such as vehicle tracking and 911, and event triggered requests can be used for other applications such as location based billing. In each case, the desired location parameters can be specified.

Figure 6:
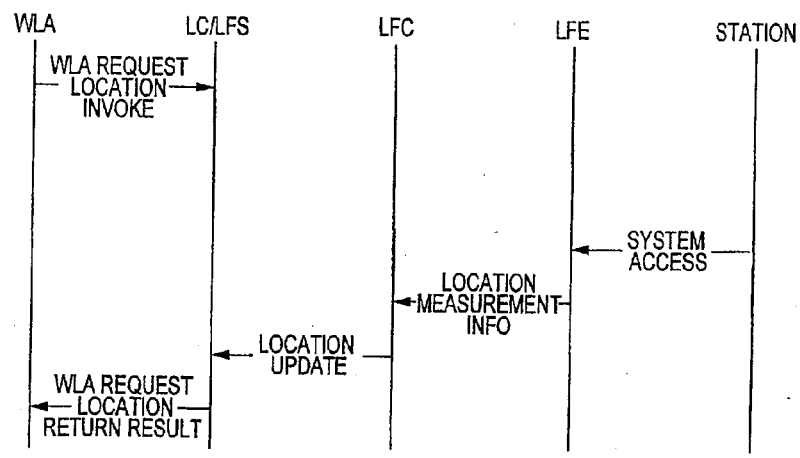
FIGS. 6-9 illustrate various wireless location interface signaling sequences in accordance with the present invention.

FIGS. 6-9 show messaging sequences for various location request situations. Specifically, FIG. 6 shows a series of messages for a location request where the application waits for the next available location determination. The process is initiated by transmitting a WLARequestedLocationInvoke message from one of the WLAs to the LC. This message may include parameter fields for Wireless Station Identification, WLA Identification, Location Request Filter, Location Request Mode (check LC or force LFE location determination), Geographic Extremes (where to look for wireless station), Request Priority (processing priority relative to other pending requests) and Fallback Timeout (time that WLA will wait for a current location determination before accepting the information stored in the LC).

In the case of FIG. 6, where the WLA waits for the next available location determination, the next message may be a system access or other triggering signal from the wireless station to the LFE. In response, the LFC sends raw location measurement information to the LFE which, in turn, provides a location update to the LC. The LM then responds to the location request from the WLA with a WLARequestLocationReturnResult message. This message may include the following parameters: Geographic Location, Location Uncertainty, Location Determination Technology, Time Stamp, Velocity, Velocity Uncertainty, and Fallback Timeout Occurred Flag.

Figure 7:
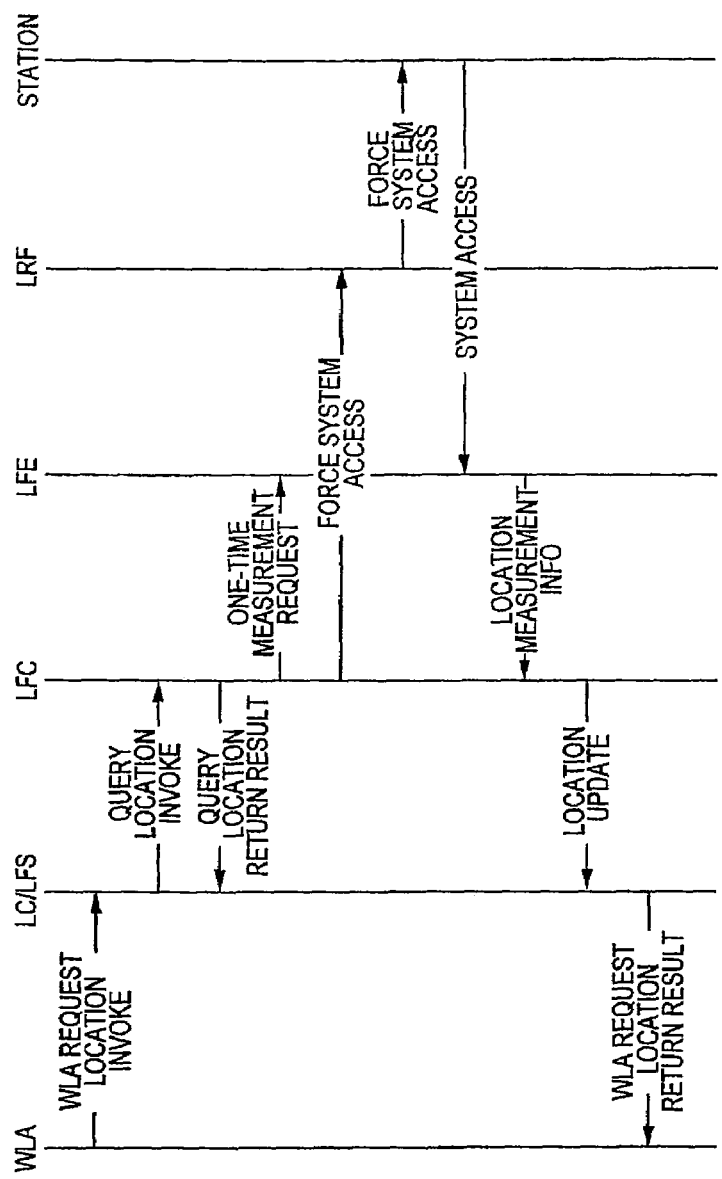

FIG. 7 illustrates a sequence of messages associated with a forced LFE access. The illustrated sequence is initiated by a WLARequestLocationInvoke as described above. In response, the LM transmits a QueryLocationInvoke message to the LFC to force an LFE determination, and the LFC confirms receipt of this message with a QueryLocationReturnResult message. The parameters of the QueryLocationInvoke message may include Wireless Station ID, Geographic Extremes and Measurement Priority (relative to other pending measurement requests). The LFC then sends a One-time Measurement Request message to the LFE to instruct the LFE to obtain location information for the wireless station of interest. In cases where ongoing monitoring is desired, this message may be sent repeatedly or periodically as indicated by multiple arrowheads in the Figure. In order to obtain a location measurement, it is generally necessary to cause the wireless station to transmit an RF signal for detection by the LFE or to communicate location data to the wireless network. This can be achieved by conducting a polling process using an LRF which requests all wireless stations to register. In this regard, the LFC issues a Force System Access message to the LRF which, in turn, transmits the Force System Access message to the wireless station. In response, a system access signal is transmitted by the wireless station and detected by the LFE. The LFE then transmits Location Measurement Information to the LFC. This may be repeated in the case of ongoing monitoring. The LFC provides a Location Update to the LC and, finally, the LM transmits a WLARequestLocationReturnResult as described above to the WLA.

Figure 8:
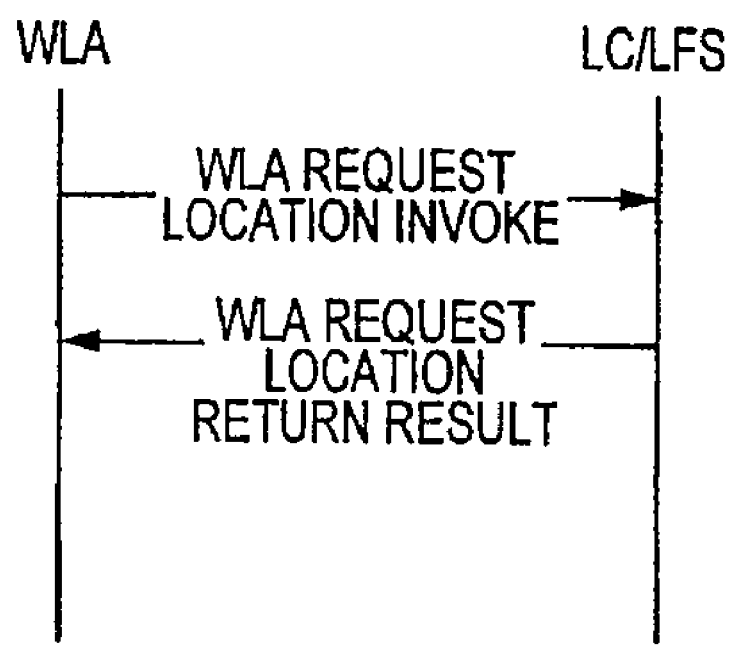

FIG. 8 represents the case where a location request can be responded to based on the data stored in the LC. This occurs, for example, where the cached data satisfies the request specification or the request specifically seeks data from the LC.

Very simply, the illustrated message sequence involves transmission of a WLARequestLocationInvoke message from the WLA to the LM and a responsive WLARequestLocationReturnResult. It will be appreciated that this case allows for a very fast response. Moreover, it is anticipated that the cached data will be sufficient in many cases for many WLAs.

Figure 9:
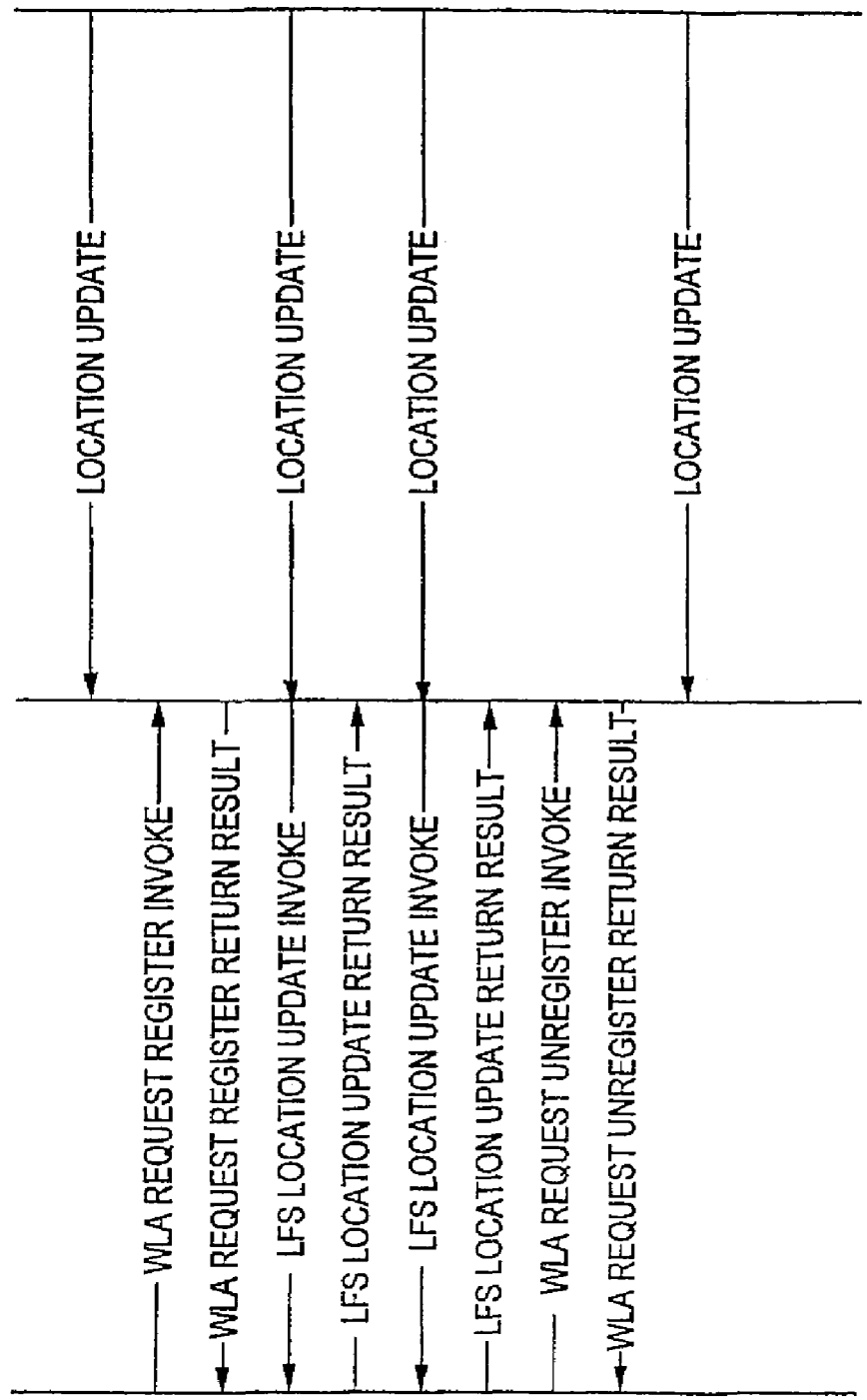

FIG. 9 shows a typical message sequence for the case where a WLA requests ongoing updates regarding the location of a wireless station. The update period is initiated upon transmission of a WLARequestRegisterInvoke message from the WLA to the LM and receiving a WLARequestRegisterReturnResult in confirmation; and terminates upon transmission of a WLARequestRegisterInvoke message and receiving a WLARequestRegisterReturnResult in confirmation. The parameters included in the Register message can include the wireless station ID, update interval, whether wireless station access should be forced, etc. As shown in the Figure, the LM receives Location Updates from time-to-time from the Location Determination Technology (LDT). It will be noted that only those Updates occurring between Registration and Unregistration are communicated to the WLA. In this regard, the Updates are communicated from the LM to the WLA via a LMLocationUpdateInvoke message and a LMLocationUpdateReturnResult is transmitted in confirmation.

The system 200 also includes a Geographic Information System (GIS) based module 222 for use in correlating geographic coordinate information to mapping information, e.g., street addresses, service area grids, city street grids (including one-way or two-way traffic flow information, speed limit information, etc.) or other mapping information. For example, it may be desired to convert the geographic coordinates of a 911 call to a street address for use by a dispatcher, or to correlate a call placement location to a wireless network billing zone. In this regard, the GIS module 222 may communicate with the LFCs 208, 210, and 212, the LFC 214 and/or the WLAs 226, 228 and 230 to correlate location information to GIS information, and to correlate GIS information to application-specific information such as wireless network billing zones. A suitable GIS based module 222 is marketed under the trademark MAPS by SignalSoft Corporation of Boulder, Colo.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method of providing location information regarding a mobile unit in a mobile communications system, the method comprising the steps of:

receiving a request for location information for a mobile unit, the request identifying the mobile unit and including a specification indicating a characteristic of the requested location information;

selecting at least one location information source from a plurality of location information sources, the selected at least one location information source being operable to provide the location information for the mobile unit that at least meets the specification and at least one of the plurality of location information sources employing a location finding technology that is different than a location finding technology employed by another one of the plurality of location information sources;

obtaining the location information from the at least one selected location information source; and providing the location information at least meeting the specification for the identified mobile unit in response to the request;

wherein selecting at least one location information source includes utilizing a default specification to select between multiple acceptable location sources, each of the multiple acceptable location sources being operable to obtain location information at least substantially conforming to the included specification.

2. The method of claim 1 wherein the plurality of location information sources includes at least one of a database containing location information and equipment associated with the mobile communications system operable to obtain the location information.

3. The method of claim 1 wherein obtaining the location information includes invoking each selected location information source to provide the location information.

4. The method of claim 1 wherein the specification establishes a priority for selecting the location information source to provide the location information for a particular request.

5. The method of claim 1 wherein the specification is related to a geographical accuracy for the location information.

6. The method of claim 1 wherein the specification is related to an allowable age of the location information.

7. The method of claim 1 wherein the specification is related to acceptable response times to provide the location information.

8. The method of claim 1 wherein receiving a request for location information includes correlating the specification to a corresponding value associated with the location information sources.

9. The method of claim 8 wherein correlating the specification includes correlating the specification to a first value associated with an individual location information source.

10. The method of claim 1 wherein selecting at least one location information source includes consulting at least a first database in which information associated with the location information sources is stored.

11. The method of claim 1 wherein the specification is related to a confidence associated with the location information.

12. The method of claim 1 wherein the request further includes a plurality of specifications for the requested location information.

13. The method of claim 12 wherein the plurality of specifications include at least one specification related to at least one of a geographical accuracy, an allowable age, an acceptable response time, and a confidence for the location information.

14. The method of claim 12 further comprising selecting the at least one location information source based, in part, on the plurality of specifications.

15. A method of providing location information regarding a mobile unit, the method comprising the steps of:

receiving a request for location information for a mobile unit, the request including a specification indicating a characteristic of the requested location information, the characteristic including at least one of a geographical accuracy, an allowable age, an acceptable response time, and a confidence for the location information;

obtaining the location information from at least one location information source of a plurality of location information sources, the at least one location information source being operable to provide the location information for the mobile unit that at least meets the specification, and at least one of the plurality of location information sources employing a location finding technology that is different than a location finding technology employed by another one of the plurality of location information sources; and providing the location information at least meeting the specification for the identified mobile unit in response to the request;

wherein selecting at least one location information source includes utilizing a default specification to select between multiple acceptable location sources, each of the multiple acceptable location sources being operable to obtain location information at least substantially conforming to the included specification.

16. The method of claim 15 wherein obtaining the location information from at least one location information source includes consulting at least a first database in which information associated with the location information sources is stored.

17. A system for providing location information regarding a mobile unit in a mobile communications system, the system including a processor and a memory medium including instructions that when executed by said processor cause the processor to perform a method comprising:

receiving a request for location information for a mobile unit, the request identifying the mobile unit and including a specification indicating a characteristic of the requested location information;

selecting at least one location information source from a plurality of location information sources, the selected at least one location information source being operable to provide the location information for the mobile unit that at least meets the specification and at least one of the plurality of location information sources employing a location finding technology that is different than a location finding technology employed by another one of the plurality of location information sources;

obtaining the location information from the at least one selected location information source; and providing the location information at least meeting the specification for the identified mobile unit in response to the request;

wherein the processor is caused to select at least one location information source by utilizing a default specification to select between multiple acceptable location sources, each of the multiple acceptable location sources being operable to obtain location information at least substantially conforming to the included specification.

18. The system of claim 17, wherein the plurality of location information sources includes at least one of a database containing location information and equipment associated with the mobile communications system operable to obtain the location information.

19. The system of claim 17, wherein the specification establishes a priority for selecting the location information source to provide the location information for a particular request.

20. The system of claim 17, wherein the specification is related to at least one of a geographical accuracy for the location information, a confidence associated with the location information, an allowable age of the location information, and acceptable response times to provide the location information.

21. The system of claim 17, wherein the request further includes a plurality of specifications for the requested location information.

22. A method of providing location information regarding a mobile unit in a mobile communications system, the method comprising the steps of:

receiving a request for location information for a mobile unit, the request identifying the mobile unit and including a metric for a desired characteristic for the requested location information;

selecting at least one location information source from a plurality of location information sources, the selected at least one location information source being operable to provide the location information for the mobile unit that at least meets the metric and at least one of the plurality of location information sources employing a location finding technology that is different than a location finding technology employed by another one of the plurality of location information sources;

obtaining the location information from the at least one selected location information source; and providing the location information at least meeting the metric specification for the identified mobile unit in response to the request;

wherein selecting at least one location information source includes utilizing a default specification to select between multiple acceptable location sources, each of the multiple acceptable location sources being operable to obtain location information at least substantially conforming to the included specification.

23. The method of claim 22, wherein the metric is related to at least one of a geographical accuracy for the location information, a confidence associated with the location information, an allowable age of the location information, and acceptable response times to provide the location information.

\* \* \* \* \*